(12) United States Patent
Song

(10) Patent No.: US 10,607,603 B2
(45) Date of Patent: *Mar. 31, 2020

(54) SPEECH RECOGNITION APPARATUS AND METHOD WITH ACOUSTIC MODELLING

(71) Applicant: Samsung Electronics Co., Ltd., Suwon-si (KR)

(72) Inventor: In Chul Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,141

(22) Filed: Aug. 9, 2018

(65) Prior Publication Data
US 2018/0350352 A1   Dec. 6, 2018

Related U.S. Application Data

(63) Continuation of application No. 15/278,651, filed on Sep. 28, 2016, now Pat. No. 10,074,361.

(30) Foreign Application Priority Data

Oct. 6, 2015   (KR) .................. 10-2015-0140646

(51) Int. Cl.
*G10L 15/16* (2006.01)
*G10L 15/02* (2006.01)
*G10L 15/06* (2013.01)

(52) U.S. Cl.
CPC .............. *G10L 15/16* (2013.01); *G10L 15/02* (2013.01); *G10L 15/063* (2013.01)

(58) Field of Classification Search
CPC ..... G10L 25/78; G10L 15/20; G10L 21/0272; G10L 15/04; G10L 15/00; G10L 15/26;
(Continued)

(56) References Cited

U.S. PATENT DOCUMENTS 6,041,299 A * 3/2000 Schuster ................. G10L 15/16
704/232
6,314,414 B1   11/2001 Keeler et al.
(Continued)

FOREIGN PATENT DOCUMENTS

EP    0 903 730 A2    3/1999
JP    2002-91479 A    3/2002
(Continued)

OTHER PUBLICATIONS

Franzini, Michael A. "A New Connectionist Architecture for Word Spotting." *1992 IEEE International Conference on Acoustics, Speech, and Signal Processing*, vol. 2., 1992. (4 pages, in English).
(Continued)

*Primary Examiner* — Huyen X Vo
(74) *Attorney, Agent, or Firm* — NSIP Law

(57) ABSTRACT

Provided is a speech recognition apparatus. The apparatus includes a preprocessor configured to extract select frames from all frames of a first speech of a user, and a score calculator configured to calculate an acoustic score of a second speech, made up of the extracted select frames, by using a Deep Neural Network (DNN)-based acoustic model, and to calculate an acoustic score of frames, of the first speech, other than the select frames based on the calculated acoustic score of the second speech.

27 Claims, 9 Drawing Sheets

(58) Field of Classification Search
CPC ....... G10L 15/08; G10L 15/142; G10L 15/16; G10L 15/265; G10L 15/28; G10L 2015/025; G10L 15/02; G10L 15/083; G10L 15/10

USPC ........................ 704/1–10, 230–257, 270–277

See application file for complete search history.

(56) References Cited

U.S. PATENT DOCUMENTS

| | | | |
|---|---|---|---|
| 8,378,198 | B2 | 2/2013 | Cho |
| 9,263,036 | B1 | 2/2016 | Graves |
| 2006/0111897 | A1* | 5/2006 | Gemello .................. G10L 15/16 704/202 |
| 2008/0033723 | A1* | 2/2008 | Jang ........................ G10L 25/78 704/254 |
| 2014/0019131 | A1 | 1/2014 | Lee et al. |
| 2016/0086600 | A1* | 3/2016 | Bauer ...................... G10L 15/16 704/202 |
| 2017/0032244 | A1 | 2/2017 | Kurata |

FOREIGN PATENT DOCUMENTS

| | | |
|---|---|---|
| JP | 2010-96808 A | 4/2010 |
| JP | 2014-142465 A | 8/2014 |
| KR | 10-2011-0081643 A | 7/2011 |
| KR | 10-2014-0028174 A | 3/2014 |
| WO | WO 2004/057573 A1 | 7/2004 |

OTHER PUBLICATIONS

Zhu, Qifeng, et al. "On the Use of Variable Frame Rate Analysis in Speech Recognition." *2000 IEEE International Conference on Acoustics, Speech, and Signal Processing. Proceedings*, vol. 3, 2000 (4 pages in English).

Gillick, Dan, et al. "Don't Multiply Lightly: Quantifying Problems with the Acoustic Model Assumptions in Speech Recognition." *2011 IEEE Workshop on Automatic Speech Recognition & Understanding*, 2011 (6 pages in English).

Gillick, Dan et al., "Discriminative Training for Speech Recognition is Compensating for Statistical Dependence in the Hmm Framework." 2012 IEEE International Conference on Acoustics, Speech and Signal Processing (ICASSP), 2012 (4 pages in English).

Graves, Alex, et al. "Speech Recognition with Deep Recurrent Neural Networks", *2013 IEEE International Conference on Acoustics, Speech and Signal Processing*, 2013 (5 pages in English).

Graves, Alex, Navdeep Jaitly, and Abdel-rahman Mohamed. "Hybrid Speech Recognition with Deep Bidirectional LSTM." *2013 IEEE Workshop on Automatic Speech Recognition and Understanding*, 2013 (6 pages in English).

Vanhoucke, Vincent, et al. "Multiframe Deep Neural Networks for Acoustic Modeling." *2013 IEEE International Conference on Acoustics, Speech and Signal Processing*, 2013 (4 pages in English).

Sak, Haşim, et al. "Fast and Accurate Recurrent Neural Network Acoustic Models for Speech Recognition." arXiv preprint arXiv:1507.06947 (2015). (5 pages, in English).

Extended European Search Report dated Nov. 25, 2016 in corresponding European Patent Application No. 15192602.7 (12 pages, in English).

* cited by examiner

SPEECH RECOGNITION APPARATUS AND METHOD WITH ACOUSTIC MODELLING

CROSS-REFERENCE TO RELATED APPLICATION(S)

This application is a continuation of U.S. application Ser. No. 15/278,651, filed on Sep. 28, 2016, which claims the benefit under 35 USC 119(a) from Korean Patent Application No. 10-2015-0140646, filed on Oct. 6, 2015, in the Korean Intellectual Property Office, the entire disclosures of which are incorporated herein by reference for all purposes.

BACKGROUND

1. Field

The following description generally relates to a technology of speech recognition with acoustic modeling, and more particularly to a speech recognition apparatus and method with acoustic modelling.

2. Description of Related Art

A speech recognition engine is generally a hardware device that implements an acoustic model, a language model, and a decoder. The acoustic model may calculate pronunciation probabilities of each frame of an input audio signal, and the language model may provide information on frequency of use of, or connectivity between, specific words, phrases, or sentences. The decoder may calculate and output similarities of the input audio signal to specific words or sentences based on consideration of the respective information provided by the acoustic model and the language model. Here, because such automated speech recognition are implemented through computer or processor technologies, corresponding problems specifically arise in such computer or processor technologies. The technology behind such automated speech recognition is a challenging one due to varying degrees of freedom exercised by speakers in their utterances, phrasings, dialect, languages, or idiolect, and challenging due to technical failings of the underlying hardware and hardware capabilities, such as the technological problems of being able to recognize speech with sufficient correctness and speed without potentially failing to recognize the corresponding speech altogether.

A Gaussian Mixture Model (GMM) approach has generally been used to implement such probability determinations in acoustic models, but recently a Deep Neural Network (DNN) approach has been implemented to calculate the probability determinations in acoustic models, which has significantly improved speech recognition performance over the speech recognition performance of acoustic modeling that implemented the GMM approach.

Still further, a Bidirectional Recurrent Deep Neural Network (BRDNN) approach has also been used for modeling data, such as speech, which changes with time. For example, the BRDNN approach may improve accuracy in calculating pronunciation probabilities of each frame of an audio signal by considering bidirectional information, i.e., information on previous and subsequent frames.

However, because of the extra frame information provided to the DNN, as well the temporal considerations made by the DNN, a required time for calculating pronunciation probabilities corresponding to respective speech units may increase, especially as the lengths of such speech units increase. Thus, there are technological problems in automated speech recognition systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a speech recognition apparatus includes a preprocessor configured to extract select frames from all frames of a first speech of a user, and a score calculator configured to calculate an acoustic score of a second speech, made up of the extracted select frames, by using a Deep Neural Network (DNN)-based acoustic model, and to calculate an acoustic score of frames, of the first speech, other than the select frames based on the calculated acoustic score of the second speech.

The score calculator may calculate the acoustic score of the frames other than the select frames without performing acoustic modeling of the frames other than the select frames using the acoustic model.

The acoustic model may be a Bidirectional Recurrent Deep Neural Network (BRDNN) acoustic model.

The preprocessor may extract the select frames according to one or more predetermined intervals to respectively intermittently extract frames from the first speech and generates the second speech using the extracted select frames so as be connected speech, where the score calculator may collectively provide the extracted select frames to the acoustic model as the connected speech in the second speech.

The apparatus may further include a processor including the preprocessor and the score calculator, and configured to extract the select frames and generate the second speech, calculate the acoustic score of the second speech, calculate the acoustic score of the frames other than the select frames based on the calculated acoustic score of the second speech, and recognize the first speech based on calculated acoustic scores of frames of the second speech, provided by the acoustic model, and calculated acoustic scores of the frames other than the select frames.

The processor may be further configured to generate the acoustic model by training the acoustic model using a set of first non-temporally contiguous speech frames, extracted by the processor from temporally contiguous speech frames of training data.

The processor may be further configured to generate the acoustic model by further training the acoustic model using a set of second non-temporally contiguous speech frames, extracted by the processor from the temporally contiguous speech frames of the training data, the set of first non-temporally contiguous speech frames having one or more different speech frames from the set of second non-temporally contiguous speech frames.

The preprocessor may extract the select frames from all of the frames of the first speech according to a predetermined uniform interval, divide all of the frames of the first speech into two or more groupings and extracts one or more frames from each grouping, or extract the select frames from all of the frames of the first speech according to an interval that is based on determined signal strengths of frames of the first speech.

The preprocessor may extract the select frames according to m*K+i and from an N number of all of the frames of the first speech, wherein i is any integer according to $1 \leq i \leq K$, and K is any integer according to 2≤K≤N, while m is made to be one or more integers according to i≤m*K+i≤N, to extract respective m*K+i-th frames of the first speech.

With K and i being maintained, the second speech may be generated by extracting the respective m*K+i-th frames of the first speech, as m is incremented between 0 and K−1.

The score calculator may use acoustic scores of frames of the second speech, calculated by the acoustic model, as determined acoustic scores of respective frames of the first speech that correspond to the frames of the second speech, and derive an acoustic score of one of the frames other than the select frames, as an adjacent frame and being adjacent to one or more of the respective frames of the first speech, based on one or more acoustic scores of the frames of the second speech and/or one or more of determined acoustic scores of the respective frames of the first speech.

Based on a determined temporal distance between the adjacent frame and two frames of first speech, of the extracted select frames, which are temporally on both sides of the adjacent frame, the score calculator may use, as the acoustic score of the adjacent frame, a determined acoustic score of either one of the two frames as the acoustic score of the adjacent frame or a calculated acoustic score of either one of two corresponding frames of the second speech.

The score calculator may use, as the acoustic score of the adjacent frame, a statistical value based on determined acoustic scores of two frames of the first speech, of the extracted select frames, which are temporally on both sides of the adjacent frame, or based on calculated acoustic scores of two frames of the second speech corresponding to the two frames of the first speech, or the score calculator may use, as the acoustic score of the adjacent frame, a statistical value obtained by applying a weighted value to each determined acoustic score of the two frames of the first speech, or to each determined acoustic score of the two frames of the second speech, based on respectively determined temporal distances between the adjacent frame and the two frames of the first speech.

The acoustic model may be trained by using one or more second training speeches respectively generated based on frame sets differently extracted from a same first training speech.

The preprocessor may be configured to extract the frame sets from the first training speech, generate the one or more second training speeches by respectively using the extracted frame sets, and train the acoustic model by using the generated one or more second training speeches.

In one general aspect a speech recognition method includes receiving input of first speech to be recognized, extracting some frames from all frames of the first speech, generating a second speech by using the extracted frames, calculating an acoustic score of the second speech by using a Deep Neural Network (DNN)-based acoustic model, and calculating an acoustic score of the first speech based on the calculated acoustic score of the second speech.

The acoustic model may be a Bidirectional Recurrent Deep Neural Network (BRDNN) acoustic model.

The extracting of some frames may include extracting select frames from all frames of the first speech according to a predetermined uniform interval, dividing all of the frames of the first speech into two or more groupings and extracting one or more select frames from each of the groupings, or extracting select frames according to an interval that is based on determined signal strengths of frames of the first speech.

The calculating of the acoustic score of the first speech may include using two acoustic scores of frames of the second speech as acoustic scores of two frames of the first speech that correspond to the two frames of the second speech and using at least one acoustic score of the frames of the second speech for an acoustic score of an adjacent frame, of the first speech, that is adjacent to the two frames of the first speech.

The calculating of the acoustic score of the first speech may include using an acoustic score of either one of the two frames of the first speech or one of the two frames of the second speech as the acoustic score of the adjacent frame based on a determined temporal distance between the adjacent frame and the two frames of the first speech which are temporally on both sides of the adjacent frame.

The calculating of the acoustic score of the first speech may include using, as the acoustic score of the adjacent frame, a statistical value of the acoustic scores of the two frames of the first speech or acoustic scores of the two frames of the second speech, or using a statistical value obtained by applying a weighted value to the acoustic scores of the two frames of the first speech, or to the acoustic scores of the two frames of the second speech, based on a determined temporal distance between the adjacent frame and the two frames of the first speech.

In one general aspect, a speech recognition apparatus includes a frame set extractor configured to extract one or more frame sets, each differently including less than all frames of an input first training speech, a training data generator configured to generate one or more second training speeches by respectively using the extracted one or more frame sets, and a model trainer configured to train the acoustic model by using the generated one or more second training speeches.

The acoustic model may be a Bidirectional Recurrent Deep Neural Network (BRDNN).

The apparatus may further include a processor that includes the frame set extractor, the training data generator, and the model trainer, the processor further configured to extract select frames from a first speech of a user for recognition, generate a second speech using the extracted select frames, and recognize the first speech based on calculated acoustic scores of frames, of the first speech and other than the select frames, using acoustic scores of the second speech calculated by the acoustic model.

The frame set extractor may extract each of an i-th frame set according to m*K+i and from an N number of all of the frames of the first training speech, wherein i is any integer of 1≤i≤K, K is any integer of 2≤K≤N, and m is any integer of i≤mK+i≤N.

In one general aspect, a speech recognition method includes extracting one or more frame sets, each differently including less than all frames of an input first training speech, generating one or more second training speeches by using the extracted one or more frame sets, and training the acoustic model by using the generated one or more second training speeches.

The acoustic model may be a Bidirectional Recurrent Deep Neural Network (BRDNN).

The extracting of the frame sets may include setting a value i for a reference frame i to be 1, and a value of K to be a predetermined integer, extracting, from all of the frames of the first training speech, an i-th frame set which includes respective m*K+i-th frames obtained by incrementing a value of m by 1 from 0, incrementing i by 1 and, after the incrementing and in response to i not being greater than the value of K, repeating the extraction of the i-th frame set, and in response to i being greater than the value of K, ceasing the extracting of the one or more frame sets.

In one general aspect, a speech recognition apparatus includes a processor configured to identify select frames from all frames of a first speech of a user, calculate respective acoustic scores of the identified select frames by providing information of the identified select frames, less than all frames of the first speech, to an acoustic model as combined speech to calculate the respective acoustic scores of the identified select frames, and calculate respective acoustic scores of frames, of the first speech, other than the identified select frames based on one or more of the calculated respective scores of the identified select frames.

The identifying of the select frames may include extracting the identified select frames, from all frames of the first speech, according to one or more predetermined intervals to respectively intermittently extract frames from the first speech to collectively provide to the acoustic model as a connected second speech.

The processor may be further configured to recognize the first speech based on the calculated respective acoustic scores of the extracted select frames and the calculated respective acoustic scores of the frames other than the extracted select frames.

The calculating of the respective acoustic scores of the extracted select frames may include determining respective acoustic scores of the identified select frames of the first speech to have same respective acoustic scores as acoustic scores of corresponding temporally same frames, of the extracted select frames, calculated through provision of the second speech to the acoustic model.

The acoustic model may be an acoustic model trained using a set of first non-temporally contiguous speech frames from temporally contiguous speech frames of training data.

The acoustic model may be an acoustic model further trained using a set of second non-temporally contiguous speech frames from the temporally contiguous speech frames of the training data, the set of first non-temporally contiguous speech frames having one or more different speech frames from the set of second non-temporally contiguous speech frames.

The processor may be further configured to generate the acoustic model by training the acoustic model using the set of first non-temporally contiguous speech frames, extracted by the processor from the temporally contiguous speech frames of the training data, and using the set of second non-temporally contiguous speech frames, extracted by the processor from the temporally contiguous speech frames of the training data.

The set of first non-temporally contiguous speech frames may include frames that represent signal strengths determined to be categorized differently.

The set of first non-temporally contiguous speech frames may include frames that represent a grouping of signal strengths categorized differently from a grouping of signal strengths represented by the set of second non-temporally contiguous speech frames.

The selectively identified frames, from all frames of the first speech, may be identified according to one or more predetermined intervals to respectively intermittently select frames from the first speech to provide to the acoustic model.

The providing of the identified select frames to the acoustic model may include collectively providing the identified select frames as a connected second speech to a Deep Neural Network (DNN) acoustic model.

The DNN acoustic model may be a Bidirectional Recurrent Deep Neural Network (BRDNN) acoustic model.

The apparatus may further include a memory configured to store instructions, where the processor may be further configured to execute the instructions to configure the processor to perform the identifying of the select frames, calculating of the respective acoustic scores of the identified select frames, and calculating of the respective acoustic score of the frames other than the identified select frames.

Other features and aspects will be apparent from the following detailed description, the drawings, and the claims.

Figure 1:
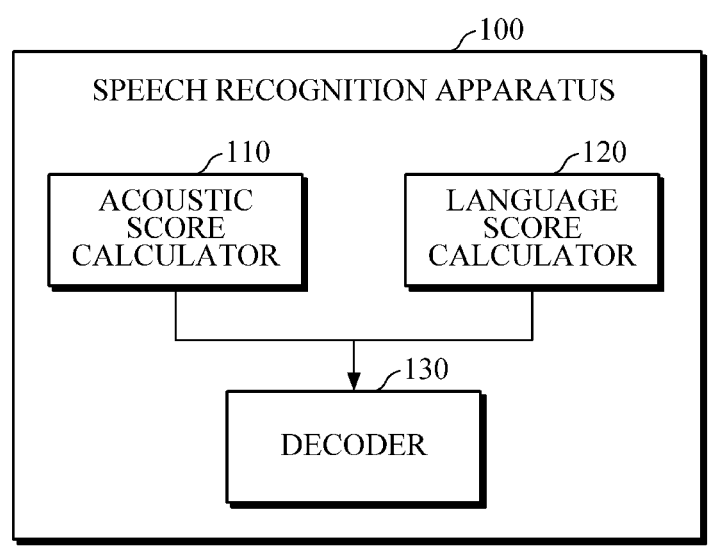
FIG. 1 is a block diagram illustrating a speech recognition apparatus according to one or more embodiments.

Throughout the drawings and the detailed description, unless otherwise described, the same drawing reference numerals may be understood to refer to the same or like elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

FIG. 1 is a block diagram illustrating a speech recognition apparatus according to one or more embodiments.

Referring to FIG. 1, the speech recognition apparatus 100 includes an acoustic score calculator 110, a language score calculator 120, and a decoder 130, for example.

The acoustic score calculator 110 calculates an acoustic score of each pronunciation of first speech, which is to be recognized, by using one or more acoustic models. As only examples, an acoustic model may be an acoustic model based on Deep Neural Network (DNN) or an acoustic model based on Bidirectional Recurrent Deep Neural Network (BRDNN). Further, in an embodiment, pronunciation is used as an example linguistic unit that may be considered in the calculation of acoustic scores. Here, pronunciation being used as a linguistic unit is merely illustrative for convenience of explanation, and any other or any other combination of linguistic units may alternatively or also be used, such as any of a phoneme, syllable, morpheme, phrase, sentence, and pronunciation linguistic unit types. Further, the linguistic unit for which the acoustic model calculates acoustic scores may vary depending on languages, such that the linguistic unit is not limited to such linguistic unit types.

The acoustic score calculator 110 may calculate acoustic scores of all frames, or all of a set number of consecutive frames, of a first speech by selectively using only some of all of the frames or selectively using only some of the set number of frames of the first speech. For example, the acoustic score calculator 110 may extract some frames from the set number of frames of the first speech according to a predetermined uniform interval, and may generate a second speech by connecting the extracted frames. Alternatively, according to the signal strength of the first speech, the acoustic score calculator 110 may extract select frames, e.g., those frames having relatively high signal strengths among all frames of the first speech or among the set number of frames of the first speech, and may generate the second speech by connecting the extracted frames. The acoustic score calculator 110 may calculate an acoustic score of the second speech by using the acoustic model, e.g., by inputting the generated second speech into the acoustic model, and then may calculate an acoustic score of the first speech by using the calculated acoustic scores of the second speech. For example, when respective frames of the second speech have been set to have select correspondence with respective remaining non-extracted frames of the first speech, the respective acoustic score of each frame of the second speech may be used as the acoustic score of each set corresponding frame of the first speech. Here, if frames are extracted from the first speech into the second speech at a set alternating interval, e.g., where every other frame of the first speech is extracted and combined into the second speech, the calculated acoustic scores of frames in the second speech that were respectively adjacent to non-extracted frames in the first speech may be used as the acoustic scores of the respectively adjacent non-extracted frames in the first speech. In this way, for a corresponding particular interval, acoustic scores may be calculated for only half of the original frames from the first speech and those calculated acoustic scores can be used to infer the acoustic scores for the remaining frames of the first speech. Here, the calculation of acoustic scores for select frames is not limited to these examples. For example, such selective calculation will be described in further detail below with reference to FIG. 2.

The language score calculator 120 may output a language score regarding information on words or phrases, e.g., a frequency of use of words or phrases or a connectivity between the same, by using a language model based on the input first speech, for example, and based on previous recognized words or phrases in the first speech. The language model may be based on an N-GRAM or a Neural Network, as only examples. Similar to the above with regard to the acoustic scores, the language score may be calculated not only in linguistic units of words or phrases, but also in any one of various aforementioned language and linguistic units.

The decoder 130 may recognize portions or all of the first speech by using the derived acoustic and language scores, such as through a selective weighting of either of the acoustic or language score results over the other, and may then return results of the speech recognition in a text format.

With regard to FIG. 1, the acoustic score calculator 110 may include a memory or cache that stores the acoustic model and/or may include one or more processors that are configured to implement the acoustic model(s) either through accessing of the acoustic model(s) from the memory or through other hardware configurations without having to load or access the acoustic model(s). For example, the processor may be configured to implement one or more of a corresponding Deep Neural Network (DNN) or Bidirectional Recurrent Deep Neural Network (BRDNN). Such an acoustic model and/or configured processor may further be updatable, e.g., either through interaction or learning through speech recognition or training with one or more users and/or through remote provision from a server or cloud service. The speech recognition apparatus 100 may also have an alternative memory where the acoustic model(s) may be stored. Similar to the acoustic score calculator 110, the language score calculator 120 may likewise access, store, or be configured to one or more of the above described language models. The speech recognition apparatus 100 may also have an alternative memory where the language model(s) may be stored. The decoder 130 may be implemented through non-processor hardware and/or processor executed instructions, for example, as caused to be executed by one or more processors.

Figure 2:
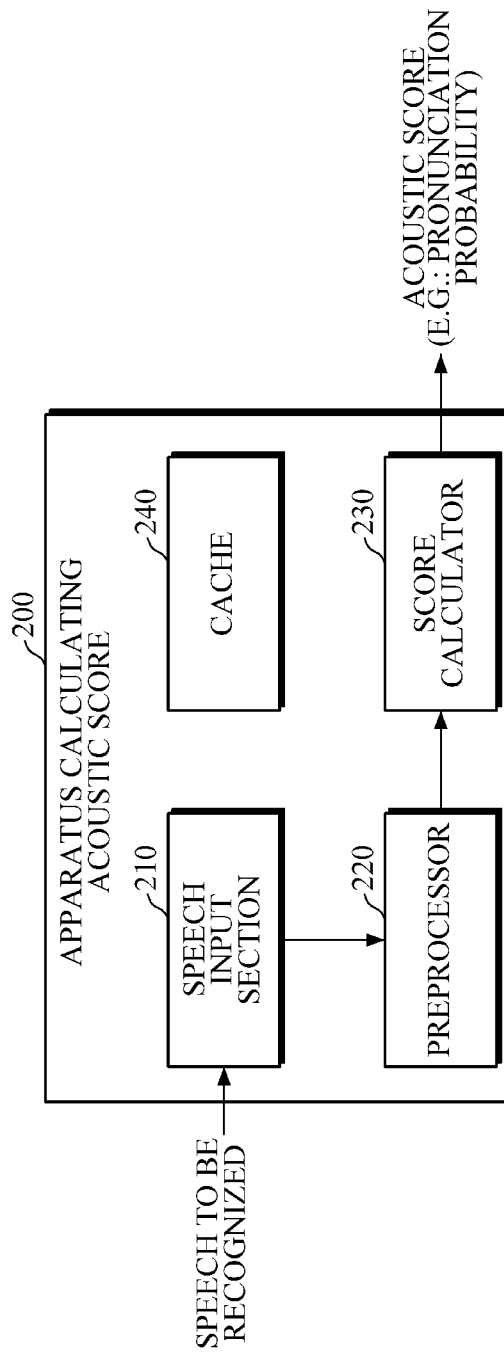
FIG. 2 is a block diagram illustrating an apparatus calculating an acoustic score according to one or more embodiments.

FIG. 2 is a block diagram illustrating an apparatus calculating an acoustic score according to one or more embodiments.

Figure 6:
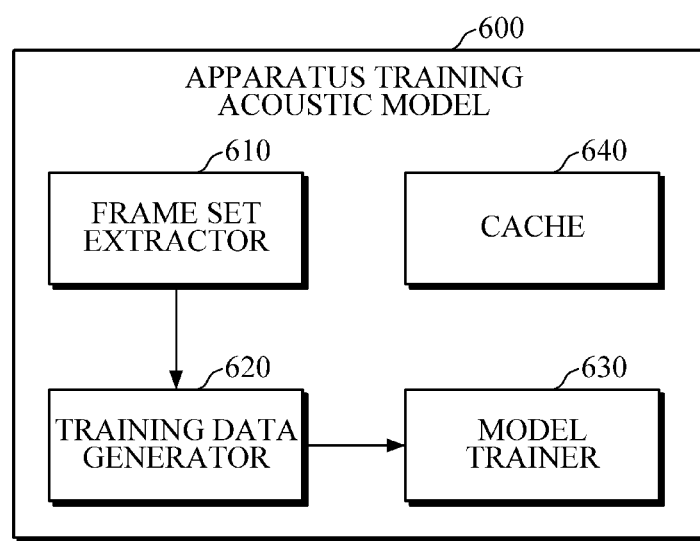
FIG. 6 is a block diagram illustrating an apparatus training an acoustic model according to one or more embodiments.
Figure 9:
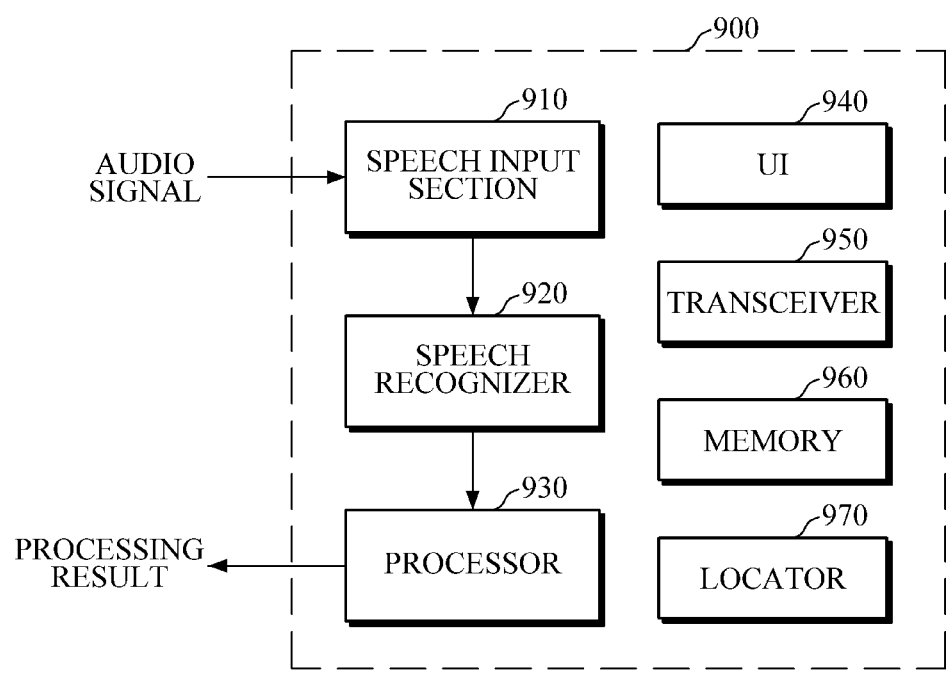
FIG. 9 is a block diagram illustrating an electronic device according to one or more embodiments.

Referring to FIG. 2, the apparatus 200 for calculating an acoustic score is implemented through hardware and, depending on embodiment, may be a separate component, may be a component in a speech recognition apparatus, such as the speech recognition apparatuses 100, 600, or 900 of FIGS. 1, 6, and 9, respectively, or may be mounted in a separate or remote hardware device and may be connected with such a speech recognition apparatus through a wired or wireless network for reception of speech to be recognized from the speech recognition apparatus and provision of calculated acoustic score results to the speech recognition apparatus, noting that such external speech recognition implementations may also include additional local or remote servers, proxies, and/or cloud computing intermediaries. The apparatus 200 may similarly be included in such a local or remote server, proxy, or cloud computing device.

Referring to FIG. 2, the apparatus 200 for calculating an acoustic score includes a speech input section 210, a preprocessor 220, and a score calculator 230, for example.

The speech input section 210 is a hardware component, receives input of the first speech, which is to be recognized, and provides or transmits the received input to the preprocessor 220. In the case where the first speech that has been input is an analog signal, the speech input section 210 may convert the analog signal into a digital signal, may divide the digital signal into speech frames, and may transmit the speech frames to the preprocessor 220. In this case, speech of one second may be divided into 100 frames, as only an example. Depending on embodiment, such as when included in a speech recognition apparatus, the speech input section 210 may include a microphone or other transducer. In addition, the speech input section 210 (or inputter) may be representative of one or more analog to digital converters and buffers. As only examples, the speech input section 210 may sequentially provide, or make available, the speech frames to the preprocessor 220, the sequential frames may be provided or made available to the preprocessor 220 with respective sequencing indicators, the sequential frames may be provided or made available to the preprocessor 220 in a shifting window of frames, or the sequential frames may be provided or made available to the preprocessor 220 in set numbers or groupings of frames. As only an example, the apparatus 200 further includes a memory or cache 240, and such speech frame data may be stored in the cache 240 and subsequently accessed by the preprocessor 220 for preprocessing. Alternatively, such a memory or cache may be located exterior of apparatus 200, such as included elsewhere in the speech recognition apparatus 100 of FIG. 1 or in a corresponding remote device from the speech recognition apparatus 100, again as only examples.

Thus, upon acquiring or receiving all frames of the first speech, or all of a set number of frames of the first speech, e.g., from the speech input section 210, the preprocessor 220 may perform a preprocessing process(s) desired or necessary for the calculating of an acoustic score of the first speech. In order to reduce the time required to calculate the acoustic score of the first speech, and which may correspondingly provide technological improvements and/or solutions over previous approaches, the preprocessor 220 may extract only some or select frames from all of the frames of the first speech, i.e., less than all of the frames of the first speech, and may generate a second speech by connecting or combining the selectively extracted frames. Here, the generation of the second speech may include not only generating a complete form of speech that may be reproduced, but also connecting speech frames per se. The connecting of the selectively extracted frames from the first speech may include making the selectively extracted frames into an order or newly sequenced form as the second speech and/or producing connection information about the respective selectively extracted frames. Further, the preprocessor 220 may provide, transmit, or make available the generated second speech to the score calculator 230, so that the second speech may be used to calculate the acoustic score of the first speech. Similar to the storing of the speech frames of the first speech, the speech frames of the second speech may be stored in a memory or cache 240 in either of the apparatus 200 or another external device.

For example, the preprocessor 220 may selectively extract one or more frames from all of the frames of the first speech according to a predetermined uniform interval, i.e., in a non-random manner. Alternatively, the preprocessor 220 may divide, organize, or categorize all of the frames into a plurality of sections or groupings according to a determined plan, and may extract only one or more frames in each section or groupings, e.g., by extracting less than all of the frames of each section or grouping when the corresponding section or grouping has more than one frame.

For example, in the case where the number of all frames of the first speech is N, or where there are a total of N frames of the first speech made available by the speech input section 210 to the preprocessor 220, and a predetermined uniform interval is K, it may be considered that pronunciation probabilities of successive frames between each Kth frame of the total N frames may be similar to each other. That is, it may be considered that the pronunciation probability of an i-th frame may be similar to those of i+1-th, i+2-th, up to i+(K−1)-th frames, for example. Also, the i+(K−1)-th, i+(K−2), etc., frames may alternatively be considered more similar to the next Kth frame, for example. Accordingly, using this example, and the variable m as a coarse control of the extracted frame and the variable i as a fine control of the extracted frame, the preprocessor 220 may extract only each of the m*K+i-th frame from all of frames in accordance with their temporal order, e.g., as m increments from 0 to N/K, for example, to choose between groupings of frames of the first speech from which to extract a frame for the second speech. Here, 'i' may be determinative of which of the frames within each grouping of K frames is selectively extracted, and thus, may be a number of a first extracted reference frame, e.g., a predetermined value among integers equal to or greater than 1 up to a predetermined value equal to or smaller than K. To select less than all of the frames from the first speech, K may be a predetermined value among integers equal to or greater than 2 and smaller than N. Lastly, as the variable m has been indicated as incrementing from 0 to N/K to choose between groupings of frames of the first speech from which to extract a frame for the second speech, m may thus be any integer that satisfies m*K+1 being equal to or greater than 1 up to being equal to or smaller than N. For example, when K equals 4 and there are a total of 12 frames in the provided first speech, as m increments from 0 to 2 the first, fifth, and ninth frames may be extracted from the first speech for inclusion in the second speech. If the predetermined value for the first reference frame isn't 1, i.e., if i was not equal to 1 but rather i is equal to 2, then the second, sixth, and tenth frames would be extracted. If i were equal to 3, then the third, seventh, and eleventh frames would be extracted, and if i were equal to 4, then the fourth, eighth, and twelfth frames would be extracted from the first speech for inclusion in the second speech. Here, though such an interval extraction approach may be repeated such that each extracted frame is equal distant from a previous extracted frame, embodiments are not limited to the same.

In another example, the preprocessor 220 may divide all of the frames into sections or groupings according to the predetermined uniform interval K, and one or more frames may be extracted in each section or grouping. In this case, the number of frames extracted in each section or grouping is not necessarily the same, and may be different according to needs. For example, based on the signal strength of speech frames included in each section corresponding to the input audio signal, a relatively larger number of frames may be extracted in a section corresponding to the original audio signal having relatively high signal strength than extracted in a section corresponding to the original audio signal having a relatively lower signal strength.

As still another example, such a division of the frames is not necessarily in a 1:1 conformance or integrally divisible by one with the input frame lengths from the speech input section 210. For example, there could be a 1:1 relationship between parsed audio frame lengths from the speech input section 210 and frame lengths in the second speech, in a first mode, or the speech frames of the second speech could have a different not always or non-1:1 relationship with the parsed audio frames from the speech input section 210, such as 1:0.75, 1:1.33, 1:2.75, etc., in a second mode. Alternatively, or in addition, the speech input section 210 could also be controlled in different modes, such as in a mode with fixed sampling rates, e.g., 10 or 20 ms, and another mode with different or selectively varied sampling rates, e.g., based on operation or settings of the preprocessor 220. In addition, with such variable sampling rate and/or variable frame lengths the sampling rate or frame lengths may also be controlled to change during or between recognition operations, e.g., depending on the determined division or groupings of the preprocessor 220.

The score calculator 230 may calculate the acoustic score of the second speech by applying the second speech, provided, transmitted, or made available from the preprocessor 220, to an acoustic model. Upon calculating the acoustic score of the second speech, the score calculator 230 may determine or calculate an acoustic score for all of the frames of the first speech by using the respectively calculated acoustic scores of the second speech.

For example, the score calculator 230 may calculate an acoustic score for each frame of the second speech by inputting all of the frames of the second speech into a DNN-based or BRDNN-based acoustic model. In this example, upon calculating the respective acoustic scores of each frame of the second speech, the score calculator 230 may use respective acoustic scores of the frames of the second speech as acoustic scores of related frames of the first speech, e.g., frames of the first speech that correspond to or are sequentially directly adjacent, in the first speech, to the frames of the second speech. Further, as an acoustic score of a frame (hereinafter referred to as an "adjacent frame") of the first speech that does not correspond to any frame of the second speech, e.g., because the preprocessor 220 did not extract that particular adjacent frame, the score calculator 230 may use an acoustic score of either one of two frames of the second speech which were immediately on both sides of the adjacent frame in the first speech, such as when the interval K was 2. Herein, the term adjacent will be used to refer to positionally related frames in the first speech, and does not necessarily mean that two frames are immediately adjacent, i.e., temporally or sequentially adjacent.

In another example, as an acoustic score of the adjacent frame of the first speech, the score calculator 230 may use a statistical value of the acoustic scores of the two frames of the second speech, e.g., an average value, a median value, a maximum value, a minimum value, an interpolated or extrapolated value, and the like. In the case where either one of such two frames does not exist, an acoustic score of the frame that does exist may be used. For example, in the above example of the 12 frame set of the first speech, the extracted ninth frame included in the second speech may be the only second speech frame that was adjacent to the tenth frame when in the first speech, so only the calculated acoustic scores of the ninth frame may be used to determine or calculate the acoustic score of the tenth frame.

In yet another example, the score calculator 230 may calculate a distance between the adjacent frame and the two frames, and based on the calculated distance, may determine to use an acoustic score of any one of the two frames as an acoustic score of the adjacent frame. For example, the score calculator 230 may use an acoustic score of an extracted frame of the second speech, of two immediately neighboring or adjacent extracted frames of the second speech, which (when in the first speech) was closer to the adjacent frame as an acoustic score of the adjacent frame. For example, again using the above example of the 12 frame set of the first speech, the extracted fifth and ninth frames included in the second speech are two neighboring frames in the second speech, though they were further distanced apart in the first speech, so the eighth frame of the first speech may correspond to the 'adjacent frame' as being adjacent to the fifth and ninth frames of the first speech but closer to the ninth frame. So, in this example, the calculated acoustic score of the ninth frame may be used determine the acoustic score of the eighth frame, e.g., by merely setting the acoustic score of the eighth frame to have the same acoustic score value as the acoustic score value of the ninth frame.

In still another example, the score calculator 230 may calculate a distance between the adjacent frame and the two frames, and may apply a weighted value to each acoustic score of the two frames based on the calculated distance. Then, the score calculator 230 may use a statistical value of acoustic scores of the two frames, to which a weighted value is applied, as an acoustic score of the adjacent frame. In this case, a higher weighted value may be applied to a frame, which is closer to the adjacent frame, of the two frames, and a relatively lower weighted value may be applied to a frame further from the adjacent frame. Thus, using the above example where the acoustic score for the eighth frame is being determined, a greater weighting may be applied to the calculated acoustic score of the ninth frame than a weighting applied to the calculated acoustic score of the fifth frame to calculate the acoustic score for the eighth frame from the calculated acoustic scores from both the fifth and ninth frames.

Though various examples of calculating the acoustic score of the first speech by using the acoustic score(s) of the second speech has been described above, embodiments are not limited thereto.

Here, the preprocessor 220 and the score calculator 230 may be separate processors or the same processor. In addition, such processor(s) may also be configured to include the speech input section 210. As only an example, the preprocessor 220 may be further configured to include the speech input section 210, so as to convert an analog audio signal into digital frame data for the preprocessing by the preprocessor 220, or analog to digital conversion may be implemented by the separate speech input section 210 and conversion of the resulting digital data into frame data may be implemented by the preprocessor 220.

Figure 3:
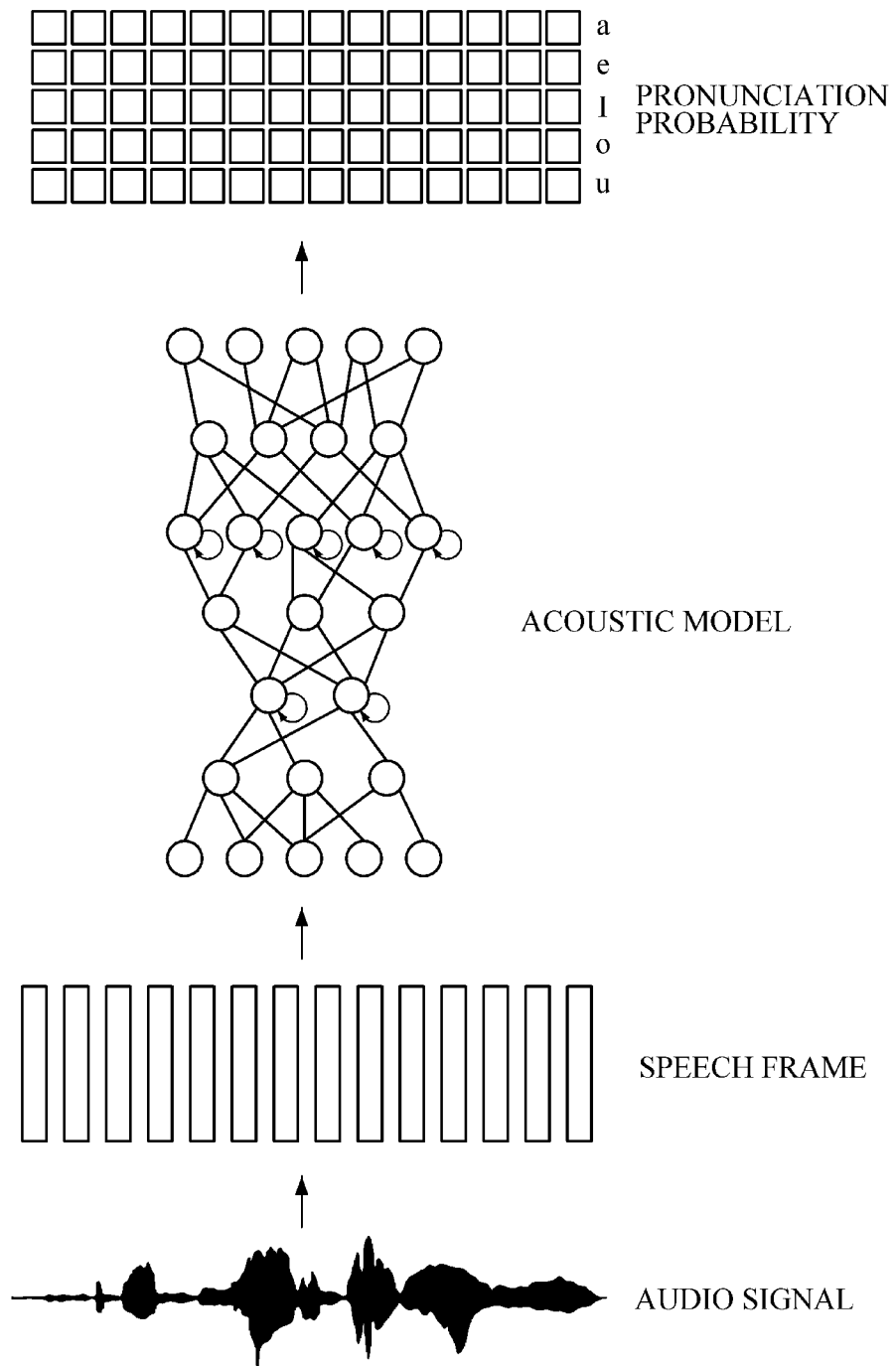
FIG. 3 is a diagram explaining a general Bidirectional Recurrent Deep Neural Network (BRDNN)-based acoustic modelling approach.
Figure 4:
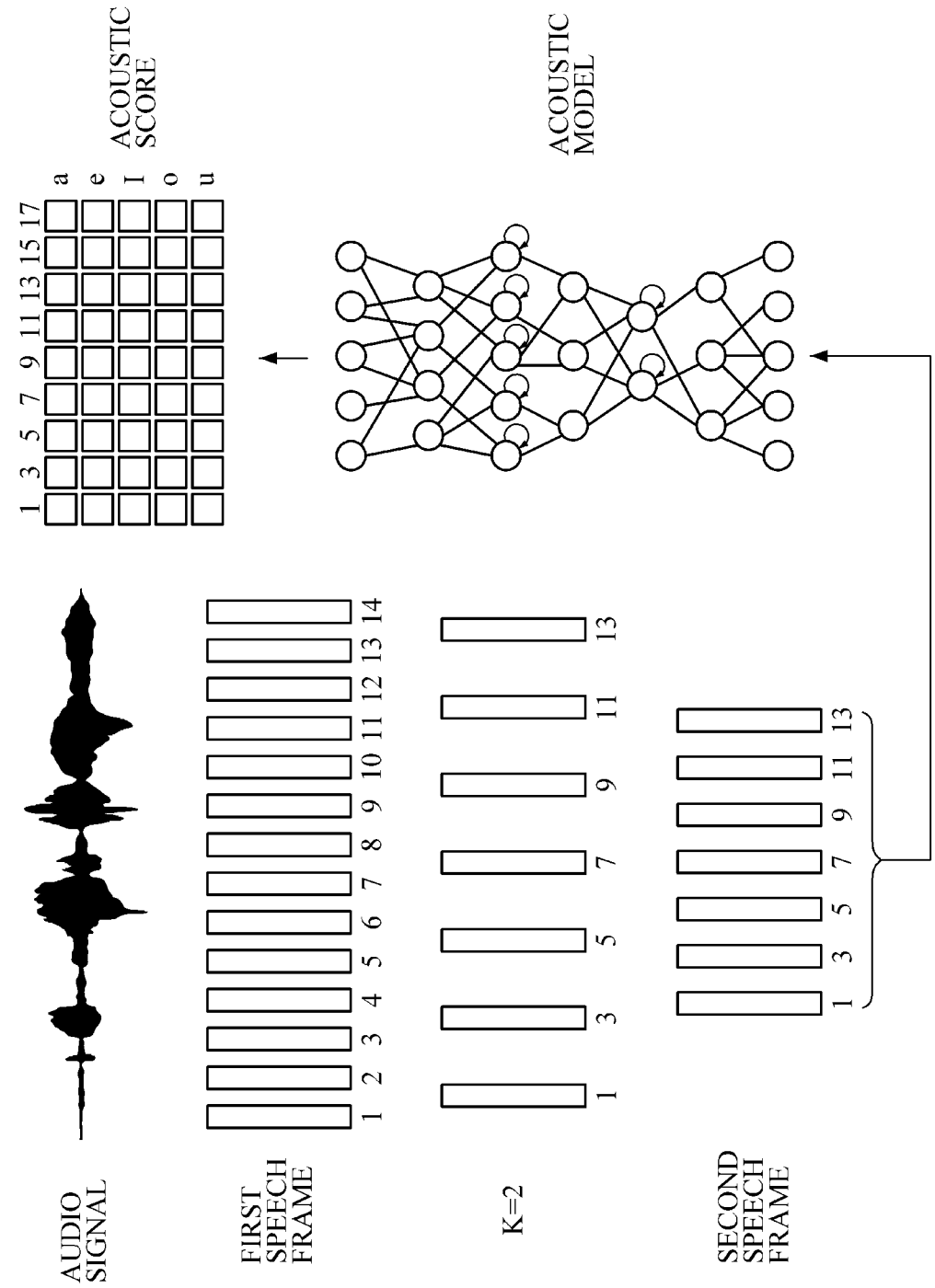
FIG. 4 is a diagram explaining an example of a BRDNN-based acoustic modelling approach according to one or more embodiments.

FIG. 3 is a diagram illustrating an example of a general Bidirectional Recurrent Deep Neural Network (BRDNN)-based acoustic modelling approach, and FIG. 4 is a diagram illustrating an example of a BRDNN-based acoustic modelling approach according to one or more embodiments.

Compared to a general Deep Neural Network (DNN) or Hidden Markov Model (HMM) approaches, the general BRDNN-based acoustic modelling approach illustrated in FIG. 3 may improve accuracy in calculating pronunciation probabilities by considering bidirectional information, i.e., information about or on previous and subsequent frames, in which the general BRDNN-based acoustic modelling approach uses as an input. The general BRDNN-based acoustic modelling approach uses as the input all of the frames of an audio signal to be recognized. For example, using the above example first speech, such a general BRDNN-based acoustic modelling approach would be input all frames of such a first speech. Thus, as illustrated in FIG. 3, in the case where an input audio signal is segmented into 14 frames, all of the 14 frames are input into the general BRDNN-based acoustic model, and a pronunciation probability is calculated by the BRDNN-based acoustic model for each frame. However, with such a general BRDNN-based acoustic modelling approach, the time required to calculate each of the acoustic scores for all of the frames, including considering temporally previous and subsequent frames, may be substantially greater than the general DNN based acoustic modeling or HMM approaches, especially as the lengths of speech units to be recognized, i.e., the entire number of frames, increase.

As illustrated in the example BRDNN-based acoustic modelling approach of FIG. 4, according to one or more embodiments, assuming that for the first reference frame to be extracted i is 1, a predetermined interval K is 2, and a first speech that has been input consists of 14 frames, a processor, such as the preprocessor 220 of FIG. 2 as only an example, may extract frames according to m*K+1, as m starts at 0 and is repeatedly incremented by 1 until m reaches 6. The processor may accordingly extract frames 1, 3, 5, 7, 9, 11, and 13 from the 14 frames of the first speech. As only examples, m may be incremented by 1 until a next m (m+1) would result in a value of m*K+1 being greater than the set N total number of frames, or until m*K+1 is within K frames of the set N total number of frames. Further, the preprocessor 220 may generate a second speech by connecting the extracted frames 1, 3, 5, 7, 9, 11, and 13, and then provide the collective frames 1, 3, 5, 7, 9, 11, and 13 to the acoustic model that is implementing a BRDNN-based acoustic modelling approach according to one or more embodiments. As noted above, and with this example, if the value of i for the first reference frame is not 1, but rather equal to 2, then the corresponding frames of the second speech would be extracted according to m*K+i, to extract framers 2, 4, 6, 8, 10, 12, and 14. Alternative approaches for selecting which frames from the first speech to extract to generate the second speech may also be utilized, as noted above.

The score calculator 230 may thus calculate acoustic scores, e.g., pronunciation probabilities, for each frame of the second speech by inputting each of the example frames 1, 3, 5, 7, 9, 11, and 13 of the second speech into an acoustic model, e.g., the example BRDNN-based acoustic modelling approach.

Upon calculating the acoustic scores of the frames 1, 3, 5, 7, 9, 11, and 13 of the second speech, the score calculator 230 may determine or calculate the acoustic scores of all of the frames 1 to 14 of the first speech in various manners as described above.

For example, Table 1 below shows the resultant calculated acoustic scores of some frames 1, 3, and 5 of the second speech for pronunciation 'a', and the corresponding determination or calculation of the acoustic scores of frames 1, 2, 3, 4, 5, and 6 of the first speech by using the acoustic scores of the second speech. That is, in this example, the acoustic scores of the frames 1, 3, and 5 of the first speech, which correspond to the frames 1, 3, and 5 of the second speech, may be used to determine, i.e., identically determine, the acoustic scores of the frames 1, 3, and 5 of the first speech. The acoustic score of the adjacent frame 2 of the first speech, i.e., immediately adjacent to frames 1 and 3 that have corresponding frames 1 and 3 in the second speech, may be determined to have the same value as the acoustic score of the immediately previous and adjacent frame 1. The same may be implemented for adjacent frames 4 and 6.

TABLE 1

| Frame | Acoustic score of second speech | Acoustic score of first speech |
|---|---|---|
| 1 | 0.6 | 0.6 |
| 2 | — | 0.6 |
| 3 | 0.2 | 0.2 |
| 4 | — | 0.2 |

TABLE 1-continued

| Frame | Acoustic score of second speech | Acoustic score of first speech |
|---|---|---|
| 5 | 0.4 | 0.4 |
| 6 | — | 0.4 |

Table 2 below shows an alternate calculation approach for acoustic scores of frames 1 through 5 of the first speech using frames 1, 3, and 5 as represented in the second speech for pronunciation 'a', by using a statistical approach, e.g., through an averaging of the acoustic scores of the second speech. Here, of the calculated acoustic scores of the frames 1, 3, and 5 of the second speech may be identically used as the acoustic scores of the corresponding frames 1, 3, and 5 of the first speech. In addition, to calculate the acoustic score of frame 2, for example, the acoustic scores of the frames 1 and 3 of the second speech may be averaged, the determined acoustic scores of frames 1 and 3 of the first speech may be averaged, or by averaging either of the calculated or determined acoustic scores for frame 1 from the respective first or second speeches and either of the calculated or determined acoustic scores for frame 3 from the respective first or second speeches. Likewise, the acoustic score of frame 4 of the first speech may be calculated by averaging the acoustic scores of the two frames 3 and 5 of the second speech or the first speech. The same may be implemented for frame 6.

TABLE 2

| Frame | Acoustic score of second speech | Acoustic score of first speech |
|---|---|---|
| 1 | 0.6 | 0.6 |
| 2 | — | 0.4 |
| 3 | 0.2 | 0.2 |
| 4 | — | 0.3 |
| 5 | 0.4 | 0.4 |

In an embodiment, e.g., as described above, acoustic scores of speech to be recognized may be calculated rapidly by inputting some frames of the speech, i.e., less than all of the frames of the speech, into the example BRDNN-based acoustic model, and then using the calculated acoustic scores from some of the frames to determine or calculate the acoustic scores of all of the frames.

Figure 5:
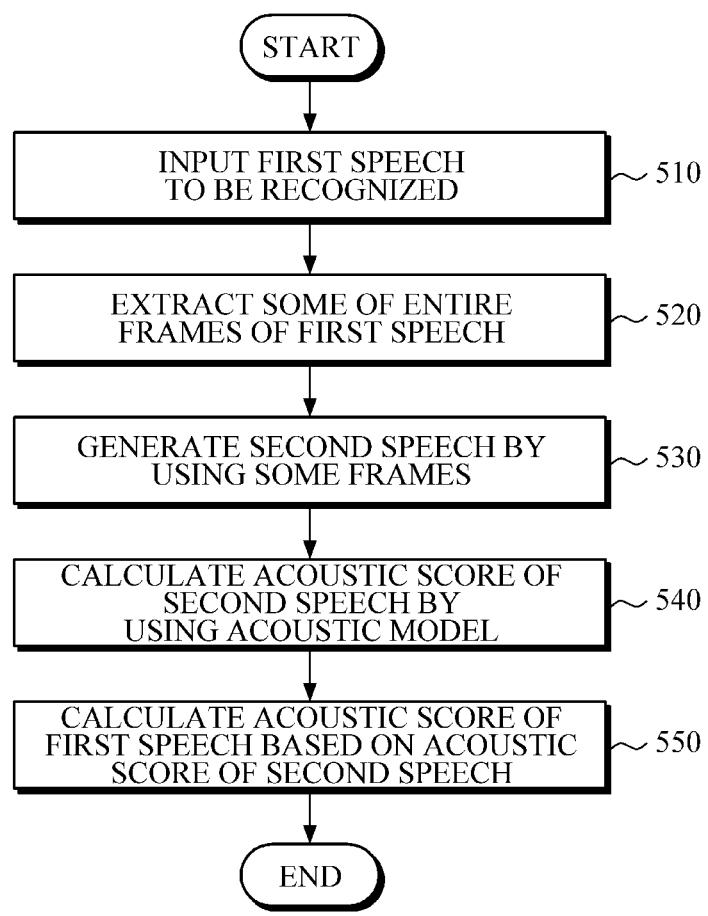
FIG. 5 is a flowchart illustrating a method of calculating an acoustic score according to one or more embodiments.

FIG. 5 is a flowchart illustrating a method of calculating an acoustic score according to one or more embodiments. The method of calculating an acoustic score may be implemented by any of a speech recognition apparatus or a separate apparatus calculating an acoustic score. As only a non-limiting example, the method of calculating an acoustic score may be implemented by the apparatus 200 of FIG. 2. Accordingly, though aspects of FIG. 5 will be explained through reference to apparatus 200, embodiments are not limited thereto.

Referring to FIG. 5, the apparatus 200 may be provided, acquire, or receive input for the first speech to be recognized in 510. In the case where the first speech is an analog signal, the apparatus 200 may convert the analog signal into a digital signal, and organize or divide the digital signal into speech frames, e.g., sequential speech frames.

In 520, the apparatus 200 may then extract some of the frames generated or acquired in 510. The extracted frames are select frames, less than all of the frames acquired or generated in 510, selected for input to an acoustic model to calculate their respective acoustic scores. In extracting the frames, the apparatus 200 may extract one frame after another from all of frames of the first speech according to a predetermined uniform interval, which may control which of all of the frames are selectively extracted from the first speech and which of all of the frames are not extracted from the first speech. In addition, or alternatively, the frames of the first speech may be divided, organized, or categorized into a plurality of sections or groupings, and one or more frames may be extracted from each section or grouping. Here, the sections or groupings may correspond to such a predetermined interval, or be based other factors, including one or more intervals that are based on determined signal strengths of each frame of the first speech. In addition, with this example, there may be more frames selected for extraction from sections or groupings with the example greater determined signal strengths, compared to a number of frames selected for extraction from sections or groupings with an example lower determined signal strength. The determined signal strengths or determined relative larger or lower signal strengths may be based on, e.g., relative to, a determined greatest signal strength or determined lowest signal strength and comparisons of signal strengths to the same based on predetermined thresholds to divide frames of the first speech into the different sections or groupings, as only examples. In addition, the differently discussed approaches for selectively extracting frames of the first speech to determine the second speech, as well as for calculating or determining the acoustic scores for the frames of the first speech, may be differently applied across all of the frames of the first speech.

To selectively extract frames from the first speech, for example, select frames of the first speech may be extracted for inclusion in the second speech according to the predetermined interval K, e.g., with example frames 1, K+1, 2K+1, 3K+1, etc., being selectively extracted from all of the frames of the first speech, without extracting the remaining frames of the first speech.

Subsequently, the apparatus 200 may determine or generate the second speech by connecting the extracted frames in 530. For example, the extracted frames may be connected in the second speech as immediately sequenced speech frames according to their temporal correspondence in the first speech, and/or connectivity information may be generated to similarly identify such new sequencing for the extracted frames in the second speech. The second speech may be stored in a memory of the apparatus 200, immediately provided to one or more acoustic models without storage, or a same memory or caching of the frames from the first speech may be used to selectively read or acquire the extracted frames of the second speech in accordance with the example connectivity information for input to the acoustic model.

Then, the apparatus 200 may calculate acoustic scores of the second speech by using one or more acoustic models, e.g., a BRDNN-based acoustic model in 540.

Next, the apparatus 200 may determine and/or calculate acoustic scores of all of the frames of the first speech based on the calculated acoustic scores of the second speech in 550.

For example, the acoustic scores of some frames of the first speech that correspond to frames of the second speech may be determined, e.g., with the apparatus 200 using the calculated acoustic scores of the corresponding frames of the second speech as the acoustic scores of the corresponding frames in the first speech. Further, in the calculation of acoustic scores of adjacent frames of the first speech that do not correspond to any frame of the second speech, e.g., as frames of the first speech that were not extracted for the second speech and that may be between the extracted frames in the first speech, the apparatus 200 may use an acoustic score of either one of two frames of the second speech which are on both sides of an adjacent frame of the first speech, or may use a statistical value of acoustic scores of the two frames of the second speech. Further, the apparatus 200 may calculate a distance between the adjacent frame and the two frames, and may use an acoustic score of either one of the two frames as an acoustic score of the adjacent frame based on the calculated distance. In addition, the apparatus 200 may calculate an acoustic score of the adjacent frame by applying a weighted value to each acoustic score of the two frames, and by using the acoustic scores, to which a weighted value is applied, of the two frames. Here, though several calculation methods have been described, the determination methods for the acoustic scores of the first speech based on calculated acoustic scores of the second speech are not limited thereto.

FIG. 6 is a block diagram illustrating an apparatus for training an acoustic model according to one or more embodiments.

In an embodiment, the apparatus 600 for training an acoustic model may train an example BRDNN-based acoustic model that is used by a speech recognition apparatus, such as the speech recognition apparatuses 100 or 900 of FIGS. 1 and 9, respectively, and/or an apparatus calculating an acoustic score, such as the apparatus 200 of FIG. 2. In addition, such an apparatus 200 or speech recognition apparatuses 100 or 900 may further include such an apparatus 600 to train the acoustic model as described further below.

As described above, in one or more embodiments an acoustic model used for speech recognition calculates acoustic scores by selectively calculating acoustic score for only some of all portions or frames of an input speech using the acoustic model, while the acoustic scores of the remaining portions or frames may be determined or calculated without being input to the acoustic model, but rather based on the calculated acoustic scores for the portions or frames that were input to the acoustic model. Accordingly, the apparatus 600 may train such an acoustic model with this expectation of how the acoustic model may be used.

Referring to FIG. 6, the apparatus 600 includes a frame set extractor 610, a training data generator 620, and a model trainer 630, for example.

The frame set extractor 630 may extract one or more frame sets, each consisting of only some of all of the frames of a first training speech.

For example, in the case where the total number of all of the frames of the first training speech is N, and a predetermined interval is set to be K, the frame set extractor 630 may extract a K number of frame sets. In this case, an i-th frame set may include each of m*K+1-th (when i=1) frames among speech frames of the first training speech, in which the value of i is any integer equal to or greater than 1 and equal to or smaller than K, the value of K is any integer equal to or greater than 2 and equal to or smaller than N, and the value of m is any integer satisfying that the value of m*K+i is equal to or greater than 1 and equal to or smaller than N. For example, in the case where N is 10, and K is 2, as m increments from 0 to 4, an extracted first frame set (i=1) may consist of frames 1, 3, 5, 7, and 9, and an extracted second frame set (i=2) may consist of frames 2, 4, 6, 8, and 10.

Alternatively, the frame set extractor 610 may configure a frame set by dividing frames into sections or groupings according to a predetermined interval, and by extracting only some frames in each section or grouping or by extracting only some frames in one or more of the sections or groupings of frames such as when one of the sections or groupings only includes a minimal number of frames or a single frame.

However, the frame set is not limited thereto, and there may be a plurality of first training speeches. In the case where there is T number of first training speeches, and a predetermined extracting interval is K, a T×K number of frame sets in total may be extracted. As described above, upon extracting one or more frame sets from any one first training speech, the training data generator 630 may generate second training speech for each frame set by sequentially connecting frames included in each extracted frame set. In addition, and only as example, in an embodiment where the apparatus 200 of FIG. 2 and the apparatus 600 of FIG. 6 are combined in a same electronic device, the preprocessor 220 of FIG. 2 could implement the frame set extractions and training speech generations, or the frame set extractor 610 and training data generator 620 could respectively implement the frame extraction and second speech generation discussed above.

The model trainer 630 may train an example BRDNN-based acoustic model by using the one or more generated second speeches. In one or more embodiments, through the selective extracting and training of the acoustic model, in combination with the selective extraction and input of frames to such an acoustic model during speech recognition, technological solutions and/or improvements over previous technological approaches may be achieved.

As only an example, the apparatus 600 may further include a memory or cache 640, where the frame set extractor 610 may store such extracted frame set(s), and from where such extracted frame set(s) may be subsequently accessed by the training data generator 620 and/or the model trainer 630. Alternatively, such a memory or cache may be located exterior of apparatus 600, such as included elsewhere in the speech recognition apparatus 100 of FIG. 1 or the speech recognition apparatus 900 of FIG. 9, or in the corresponding device remote from the speech recognition apparatus 100 or 900, again as only examples. One or more embodiments may further include the apparatus 600 being separate or even remote from the speech recognition apparatus 100 or 900.

Figure 7:
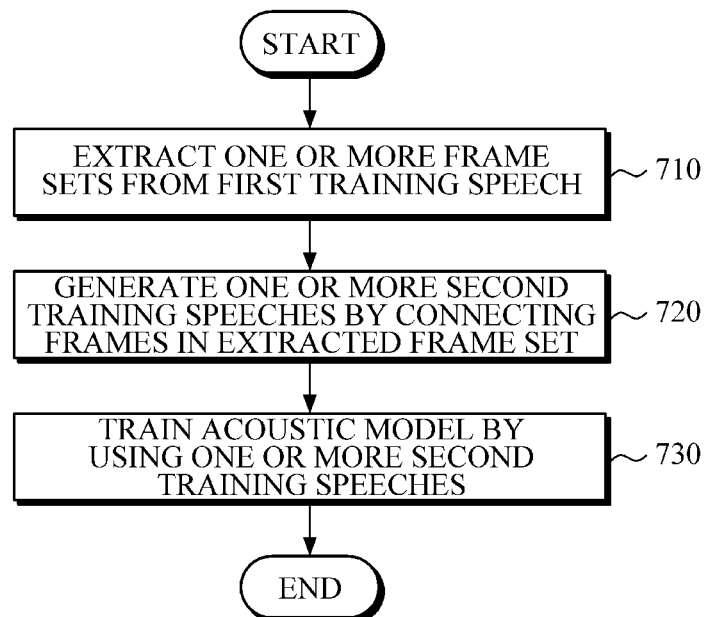
FIG. 7 is a flowchart illustrating a method of training an acoustic model according to one or more embodiments.
Figure 8:
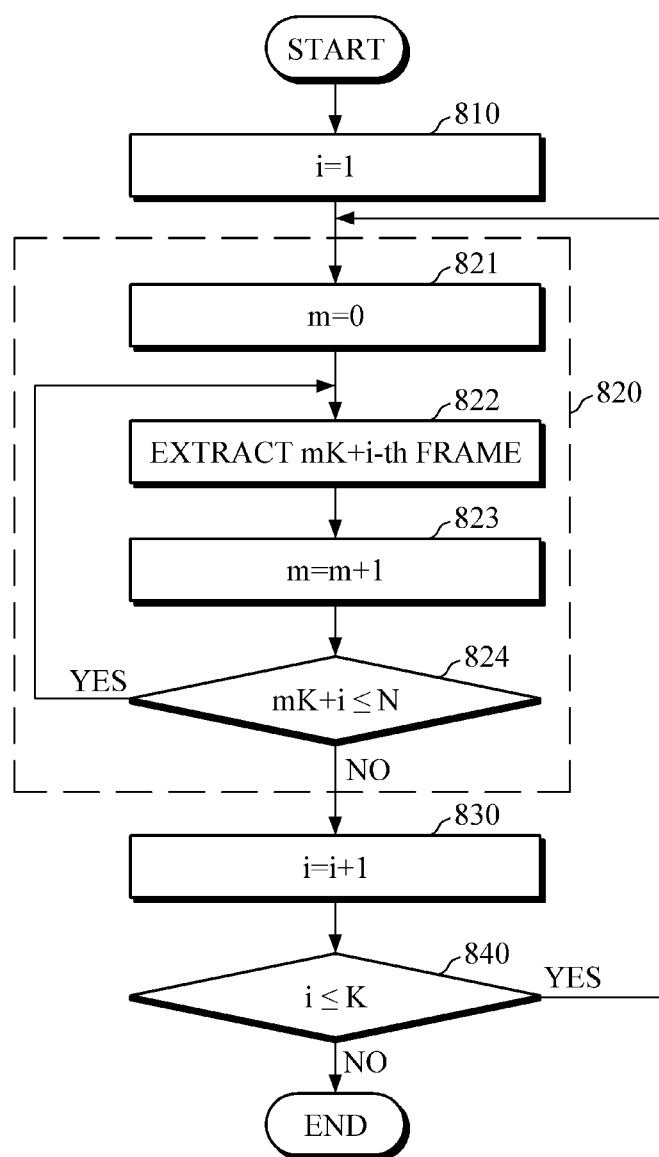
FIG. 8 is a flowchart illustrating a generation of a second training speech, according to one or more embodiments.

FIG. 7 is a flowchart illustrating a method of training an acoustic model according to one or more embodiments. FIG. 8 is a flowchart illustrating a generation of a second training speech, such as for only an example for the generation of the second training speech of FIG. 7, according to one or more embodiments.

Thus, one or more of the operations of FIGS. 7 and 8 may be performed by any of the apparatuses described herein. Accordingly, though the apparatus 600 will be used below for describing respective trainings of acoustic models in FIGS. 7 and 8, this is done for explanatory purposes as embodiments are not limited thereto. For example, any of the apparatuses of FIG. 1, 2, or 9 may also implement such trainings of one or more acoustic models and/or generations of such a second training speech, again noting that embodiments are not limited thereto.

Referring to FIG. 7, the apparatus 600 for training an acoustic model may extract one or more frames sets, each consisting of less than all of the frames of any one first training speech, in 710.

An example extracting of frame sets for 710 will be described in further detail with reference to FIG. 8, noting that embodiments are not limited thereto.

The apparatus 600 sets the value of an extracted reference frame i to be 1 in 810, and extracts a first frame set for a first training speech in 820. In this case, the apparatus 600 sets the value of m to be 0 in 821, and extracts an m*K+1-th frame, i.e., a first frame, from all of the frames of the first training speech in 822. Then, the apparatus 600 increases the value of m by 1 in 823, and determines in 824 whether the value of m*K+i is equal to or smaller than the value of N, the total number of frames in the first training speech. Upon determination in 824, where the value of m*K+i is equal to or smaller than N, the process returns to the operation in 822, and when the value of m*K+i is greater than N, the apparatus 600 increases the value of i by 1 in 830 to extract a next frame set for the first training speech, and determines whether the value of i is equal to or smaller than K in 840. Upon determination in 840, where the value of i is equal to or smaller than K, this means that there exists a next frame set to be extracted for the first training speech, and the apparatus 600 extracts the next frame set in 820, whereas if the value of i is greater than K, this means that there is no next frame set to be extracted, and the process ends.

Thus, FIG. 8 is a flowchart illustrating an example of extracting a K number of frame sets for one first training speech. However, in the case where there is a plurality of first training speeches, the process may be repeated, e.g., by incrementing i, until all frame sets of all the first training speeches are completely extracted, though embodiments are not limited thereto.

Referring back to FIG. 7, upon extracting one or more frame sets from the first training speech, the apparatus 600 may generate one second training speech for each frame set by connecting the respectively extracted frames included in each extracted frame set in 720.

Then, the apparatus 600 may then train a BRDNN-based acoustic model by using the generated second training speech including all the extracted frames for all of the extracted frame sets, or may serially train the acoustic model by using one or more generated second training speeches respectively corresponding to the extracted frame sets.

FIG. 9 is a block diagram illustrating an electronic device according to one or more embodiments.

Referring to FIG. 9, the electronic device 900 may include a speech input section 910, a speech recognizer 920, and a preprocessor 930. For example, the speech input section 910 may include a microphone, be operable in connection with or in response to such a microphone of the user interface (UI) 940, or may be part of the UI 940. In one or more embodiments, the speech recognizer 920 may include the speech recognition apparatus 100 of FIG. 1, for example. The speech recognizer 920 may be understood by reference to any of the above embodiments, such that detailed description thereof will be omitted.

The speech input section 910 may receive a user's audio signal that is input through the microphone. In one or more embodiments, the user's audio signal may be related to sentences to be translated into another language or commands for controlling a TV set, driving a vehicle, intelligent speech/conversation, or the like and only as examples. Thus, one or more of the respective acoustic and/or language models of the speech recognizer 920 may be generated to model different languages, or the processor 930 may include and/or implement a translation/conversion dictionary for the translation.

The speech recognizer 920 may convert an analog audio signal input by a user into a digital signal, and may divide the signal into a plurality of speech frames.

Further, the speech recognizer 920 may calculate acoustic scores by selectively performing one or both of inputting all of the frames of the user's audio signal to an acoustic model and inputting less than all of the user's audio signal to the same or a differently trained acoustic model, and may accordingly output results of speech recognition by using the calculated acoustic scores. In addition, when the speech recognizer 920 inputs less than all of the user's audio signal to such an acoustic model, the speech recognizer 920 may calculate acoustic scores of all of the speech frames by extracting only some of all of the frames of the input audio signal and providing only the select extracted frames to the example acoustic model to have their acoustic scores calculated by the acoustic model. The acoustic model calculated acoustic scores for the extracted frames may be used to determine or calculate the acoustic scores for the remaining frames of the user's input audio signal that are not input to the acoustic model, for example. In this manner, the speech recognizer 920 may calculate acoustic scores of a user's audio signal rapidly and more accurately or efficiently, e.g., compared to previous technological approaches. The speech recognizer 920 may further be configured to include any, any combination, or all of the speech recognition apparatuses of FIGS. 1, 2, 6, and 9.

The speech recognizer 920 may output a speech recognition result in a text format by recognizing a user's speech by using the acoustic scores obtained rapidly and by using the result obtained by applying such an acoustic model.

The processor 930 may perform an operation desired by a user in response to the speech recognition result. For example, the processor 930 may output the recognition result of speech input by a user in voice through a speaker represented by the UI 940 and the like, or may provide the recognition result in a text format on a display represented by the UI 940. Further, the processor 930 may perform operations to process commands (e.g., power on/off, volume control, etc.) regarding the electronic apparatus 900. In addition, the processor 930 may execute applications installed in the electronic device 900, operate a web browser to browse a website desired by a user, or perform a mapping operation using the locator 970, e.g., a GPS device, based on the recognized user's speech. Moreover, the processor 930 may translate the speech recognition result into another language, and may output a translated result in voice or in a text format. However, the processor 930 is not limited thereto, and may be used in other various applications.

In addition, the processor 930 may control the transceiver 950 to transmit results of the speech recognition to another exterior or remote device, such as in response to another speech recognition apparatus that provided the input speech to the speech input section 910 or the speech recognizer 920 for recognition by the speech recognizer 920. The transceiver 950 is hardware that may use any one communication method among LAN, Wi-Fi, Bluetooth, Infrared Data Association (IrDA), HomeRF, Near-Field Communication (NFC), Ultra Wide Band (UWB), ZigBee, Global System for Mobile Communications, Code Division multiple Access (CDMA), Long Term Evolution (LTE), and Wireless Broadband (WiBro), for transmission and/or reception of data. The transceiver 950 is also representative of an antenna for transmitting and receiving communication data as describe in the methods discussed herein. However, the communication method used by the transceiver 950 is not limited thereto, and the transceiver 950 may also use other communication methods for communication between devices. Herein, use of the term 'transmit' can refer to either of transmission of information using the example transceiver 950 of the electronic device/speech recognition apparatus 900 of FIG. 9, the internal communication bus of the electronic device/speech recognition apparatus 900 of FIG. 9, or direct or internal electrical interconnection(s) between described components, sub-subcomponents, or processing hardware elements. In addition, any or all of the described or suggested apparatuses herein may similarly include such a transceiver, communication bus, and/or electrical interconnections. In addition, the transmitting term may also refer to a storage of information to one or more caches or memories of the underlying device, remote device, components, sub-components, or processing hardware element and a provision to or request by, availability to, and/or acquiring of the stored information by another device, component, sub-component, or processing hardware element from such one or more memories.

The electronic device 900 may be a mobile terminal and/or wearable device. Such a mobile terminal or wearable device has user input and output hardware in the UI 940, representative of a microphone, display/touch screen, physical buttons, speaker, vibration motor, camera, e.g., inter-coupled via a communication bus to one or more processors of the electronic device 900 and a memory, such as memory 960. The disclosed speech recognition and model training features of FIGS. 1-8 may also be especially useful in wearable devices which generally do not have physical keyboards and only limited display area for user text/command entry, though embodiments may alternatively exist where the UI 940 includes such a physical keyboard and display(s). Upon recognizing a user's speech, the processor 930 of the electronic device 900 may effectuate commands (such as "text Frank", "what is the weather?", "capture image," "start recording", and the like) responsive to the recognized speech and/or may transcribe the recognized text to facilitate communications such as text messages, emails, various instant messengers, and the like.

Thus, as a non-exhaustive example only, the electronic device 900 as described herein may be a mobile device, such as a cellular phone, a smart phone, a wearable smart device (such as a ring, a watch, a pair of glasses, a healthcare device, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, other healthcare device, a mobile robot, a vehicle electronic device, user interface, or controller, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

Still further, the memory 960 may be used to store one or more generated acoustic and/or language models to be used by the speech recognizer 920. The speech recognizer 920 may further be configured to generate an acoustic model such as described above with regard to FIGS. 6-8. The memory 960 is a non-transitory medium that may store executable instructions to implement any of the above speech recognition and/or acoustic model generation discussed herein with regard to FIGS. 1-8. In addition, the memory 960 may also be representative, or be used corresponding to the same discussion, the caches 240 and 640 of FIGS. 2 and 6, for example.

Accordingly, the acoustic score calculator 110, language score calculator 120, decoder 130, speech input section 210, preprocessor 220, score calculator 230, frame set extractor 610, training data generator 620, model trainer 630, speech input section 910, speech recognizer 920, processor 930, locator 970, user interface 940, transceiver 950, and memory 960 in FIGS. 1, 2, 6, and 9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3-5 and 7-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, a terminal/device/apparatus as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A speech recognition apparatus, the apparatus comprising:
    a processor configured to:
        obtain plural frames of a first speech of a user;
        extract select frames from the plural frames;
        calculate acoustic scores of the extracted select frames as connected speech, by using a Neural Network (NN)-based acoustic model collectively provided the extracted select frames, less than all of the plural frames, as the connected speech; and
        recognize the plural frames of the first speech based on the calculated acoustic scores of the extracted select frames.

2. The apparatus of claim 1, wherein, for the recognition of the plural frames of the first speech, the processor is configured to infer an acoustic score of one or more frames of the plural frames other than the extracted select frames without performing acoustic modeling on the one or more frames.

3. The apparatus of claim 1,
    wherein, for the extraction of the select frames, the processor is configured to extract the select frames according to one or more predetermined intervals of the plural frames to respectively intermittently extract frames from the plural frames, and generate a second speech using the extracted select frames so as be the connected speech.

4. The apparatus of claim 1,
    wherein, for the extraction of the select frames, the processor is configured to divide all of the plural frames of the first speech into two or more groupings and extract one or more frames from each grouping, or extract the select frames from all of the plural frames of the first speech according to an interval that is based on determined signal strengths of frames of the first speech.

5. The apparatus of claim 4, wherein, for the extraction of the select frames, the processor is further configured to extract the select frames according to m*K+i and from an N number of all of the plural frames of the first speech, wherein i is any integer according to $1 \leq i \leq K$, and K is any integer according to $2 \leq K \leq N$, while m is made to be one or more integers according to $i \leq m*K+i \leq N$, to extract respective m*K+i-th frames of the first speech.

6. The apparatus of claim 5, wherein, with K and i being maintained, the select frames are extracted by extracting the respective m*K+i-th frames of the first speech, as m is incremented between 0 and K−1.

7. The apparatus of claim 1, wherein, for the recognition of the plural frames of the first speech, the processor is configured to use calculated acoustic scores of frames of the extracted select frames, calculated by the acoustic model, for inferring acoustic scores of respective frames of the plural frames of the first speech that correspond to the frames of the extracted select frames, the use of the calculated acoustic scores including deriving an acoustic score of one of the plural frames other than the extracted select frames, as an adjacent frame and being adjacent to one or more of the frames of the extracted select frames or the respective frames of the first speech, based on one or more calculated acoustic scores of the frames of the extracted select frames and/or one or more derived acoustic scores of the respective frames of the first speech.

8. The apparatus of claim 7, wherein, for the recognition of the plural frames of the first speech and based on a determined temporal distance between the adjacent frame and two frames of the extracted select frames that are temporally on both sides of the adjacent frame, the processor is configured to infer the acoustic score of the adjacent frame from a determined acoustic score of either one of the two frames.

9. The apparatus of claim 7, wherein, for the recognition of the plural frames of the first speech, the processor is configured to
    use, as the acoustic score of the adjacent frame, a statistical value based on determined acoustic scores of two frames of the extracted select frames that are temporally on both sides of the adjacent frame, or
    use, as the acoustic score of the adjacent frame, a statistical value obtained by applying a weighted value to each determined acoustic score of the two frames based on respectively determined temporal distances between the adjacent frame and the two frames.

10. The apparatus of claim 1, wherein the acoustic model is an acoustic model trained to calculate acoustic scores, for recognition of all of multiple frames of a speech, by calculating the acoustic scores using less than the all of the multiple frames of the speech.

11. The apparatus of claim 1, further comprising a memory configured to store instructions,
    wherein the processor is further configured to execute the instructions to configure the processor to perform the calculating of the acoustic scores of the extracted select frames by implementing the NN-based acoustic model, and the recognizing of the plural frames of the first speech.

12. The apparatus of claim 1, wherein the acoustic model is a NN having recurrent connections for the calculating of the acoustic scores.

13. The apparatus of claim 12, wherein the NN includes bi-directional connections for the calculating of the acoustic scores.

14. The apparatus of claim 1, wherein the recognition of the plural frames of the first speech based on the calculated acoustic scores of the extracted select frames further includes recognition of the plural frames of the first speech based on the calculated acoustic scores of the extracted select frames and one or more determined acoustic scores of remaining frames, other than the extracted select frames, of the plural frames of the first speech,
wherein the one or more acoustic scores of the remaining frames are respectively determined only based on one or more corresponding calculated acoustic scores of the calculated acoustic scores, or determined only based on the one or more corresponding calculated acoustic scores and one or more of other respectively determined acoustic scores of the remaining frames.

15. The apparatus of claim 1,
wherein the processor is further configured to,
upon calculation of one or more respective acoustic scores, for the calculation of the acoustic scores of the extracted select frames, determine one or more acoustic scores of remaining frames, other than the extracted select frames and of the plural frames of the first speech, from at least one of the calculated one or more respective acoustic scores, and
wherein the recognition of the plural frames of the first speech is based on the one or more respective acoustic scores and the one or more determined acoustic scores.

16. The apparatus of claim 1, wherein the recognition of the plural frames of the first speech based on the calculated acoustic scores of the extracted select frames includes recognition of the plural frames without calculating acoustic scores of remaining frames, other than the extracted select frames and of the plural frames of the first speech, using the acoustic model while the extracted select frames respectively represent non-stationary speech.

17. A speech recognition apparatus, the apparatus comprising:
a processor configured to:
obtain plural frames of a first speech of a user;
extract select frames from the plural frames;
calculate acoustic scores of the extracted select frames as connected speech, by using a Neural Network (NN)-based acoustic model provided the extracted select frames, less than all of the plural frames, as the connected speech; and
recognize the plural frames of the first speech based on the calculated acoustic scores of the extracted select frames,
wherein the acoustic model is a NN having bi-directional connections for the calculating of the acoustic scores.

18. A processor-implemented speech recognition method, the method comprising:
obtaining plural frames of a first speech of a user;
extracting select frames from the plural frames;
calculating acoustic scores of the extracted select frames as connected speech, by using a Neural Network (NN)-based acoustic model collectively provided the extracted select frames, less than all of the plural frames, as the connected speech; and
recognizing the plural frames of the first speech based on the calculated acoustic scores of the extracted select frames.

19. The method of claim 18, wherein the acoustic model is a NN having recurrent and bi-directional connections for the calculating of the acoustic scores.

20. The method of claim 18,
wherein the extracting of the select frames is performed according to one or more predetermined intervals of the plural frames to respectively intermittently extract frames from the plural frames, and further includes generating a second speech using the extracted select frames so as be the connected speech.

21. The method of claim 18, wherein the extracting of the select frames comprises extracting the select frames from all of the plural frames of the first speech according to a predetermined uniform interval, dividing all of the plural frames of the first speech into two or more groupings and extracting one or more select frames from each of the groupings, or extracting the select frames from all of the plural frames of the first speech according to an interval that is based on determined signal strengths of frames of the first speech.

22. The method of claim 21, wherein the extracting of the select frames includes extracting the select frames according to m*K+i and from an N number of all of the plural frames of the first speech, wherein i is any integer according to $1 \leq i \leq K$, and K is any integer according to $2 \leq K \leq N$, while m is made to be one or more integers according to $i \leq m*K+i \leq N$, to extract respective m*K+i-th frames of the first speech.

23. The method of claim 22, wherein, with K and i being maintained, the select frames are extracted by extracting the respective m*K+i-th frames of the first speech, as m is incremented between 0 and K−1.

24. The method of claim 18, wherein the recognizing of the plural frames of the first speech includes using calculated acoustic scores of frames of the extracted select frames, calculated by the acoustic model, for inferring acoustic scores of respective frames of the plural frames of the first speech that correspond to the frames of the extracted select frames, the using of the calculated acoustic scores including deriving an acoustic score of one of the plural frames other than the extracted select frames, as an adjacent frame and being adjacent to one or more of the frames of the extracted select frames or the respective frames of the first speech, based on one or more calculated acoustic scores of the frames of the extracted select frames and/or one or more derived acoustic scores of the respective frames of the first speech.

25. The method of claim 24, wherein the recognizing of the plural frames of the first speech is based on a determined temporal distance between the adjacent frame and two frames of the extracted select frames that are temporally on both sides of the adjacent frame, with the using of the calculated acoustic scores including inferring the acoustic score of the adjacent frame from a determined acoustic score of either one of the two frames.

26. The method of claim 24, wherein the using of the calculated acoustic scores includes:
using, as the acoustic score of the adjacent frame, a statistical value based on determined acoustic scores of two frames of the extracted select frames that are temporally on both sides of the adjacent frame, or
using, as the acoustic score of the adjacent frame, a statistical value obtained by applying a weighted value to each determined acoustic score of the two frames based on respectively determined temporal distances between the adjacent frame and the two frames.

27. The method of claim 18, wherein the acoustic model is an acoustic model trained to calculate acoustic scores, for recognition of all of multiple frames of a speech, by calculating the acoustic scores using less than the all of the multiple frames of the speech.

* * * * *